United States Patent
Deng

(10) Patent No.: US 11,659,442 B2
(45) Date of Patent: May 23, 2023

(54) WIRELESS COMMUNICATION SYSTEM, MAIN BASE STATION, SECONDARY BASE STATION, AND WIRELESS COMMUNICATION METHOD

(71) Applicant: NEC Corporation, Tokyo (JP)

(72) Inventor: Lianjun Deng, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/769,375

(22) PCT Filed: Dec. 11, 2018

(86) PCT No.: PCT/JP2018/045384
§ 371 (c)(1),
(2) Date: Jun. 3, 2020

(87) PCT Pub. No.: WO2019/117109
PCT Pub. Date: Jun. 20, 2019

(65) Prior Publication Data
US 2020/0296626 A1    Sep. 17, 2020

(30) Foreign Application Priority Data
Dec. 13, 2017  (JP) .............................. JP2017-238515

(51) Int. Cl.
*H04W 28/08* (2023.01)
*H04W 76/15* (2018.01)
(Continued)

(52) U.S. Cl.
CPC ..... *H04W 28/085* (2013.01); *H04W 28/0278* (2013.01); *H04W 76/15* (2018.02); *H04W 84/18* (2013.01)

(58) Field of Classification Search
CPC ... H04W 84/18; H04W 28/085; H04W 76/15; H04W 28/278; H04W 28/0958;
(Continued)

(56) References Cited

U.S. PATENT DOCUMENTS

| 2006/0246916 | A1 | 11/2006 | Cheng et al. |
| 2011/0261747 | A1* | 10/2011 | Wang ............... H04W 16/26 370/315 |

(Continued)

FOREIGN PATENT DOCUMENTS

| JP | 2010-016881 A | 1/2010 |
| JP | 2016-123051 A | 7/2016 |
| JP | 2017-085667 A | 5/2017 |

OTHER PUBLICATIONS

Japanese Office Action for JP Application No. 2019-559640 dated Mar. 30, 2021 with English Translation.
(Continued)

*Primary Examiner* — Omer S Mian

(57) ABSTRACT

To enable a communication band between base stations to be efficiently used, a wireless communication system provided with a main base station and a secondary base station. A wireless communication system, wherein when dual connectivity, which is an operation mode that allows connection to both the main base station and the secondary base station by a terminal, is executed, the secondary base station transmits information pertaining to the free buffer space of a wireless data bearer group comprising a plurality of wireless data bearers to the main base station in units of a wireless data bearer group.

5 Claims, 11 Drawing Sheets

(51) Int. Cl.
*H04W 28/02* (2009.01)
*H04W 84/18* (2009.01)

(58) Field of Classification Search
CPC ......... H04W 28/0983; H04W 28/0815; H04W 92/20; H04W 72/04
See application file for complete search history.

(56) References Cited

U.S. PATENT DOCUMENTS

| | | | |
|---|---|---|---|
| 2014/0328182 A1* | 11/2014 | Gao | H04W 36/0069 370/236 |
| 2016/0128110 A1* | 5/2016 | Sirotkin | H04W 76/12 370/329 |
| 2016/0366616 A1 | 12/2016 | Wen et al. | |
| 2017/0078940 A1 | 3/2017 | Zhang et al. | |
| 2017/0318493 A1 | 11/2017 | Laselva et al. | |
| 2018/0227801 A1* | 8/2018 | Dudda | H04L 47/6255 |

OTHER PUBLICATIONS

Extended European Search Report for EP Application No. 18888115.5 dated Nov. 17, 2020.
Samsung, "Discussion on the flow control of the bearergroup", 3GPP TSG RAN WG3#Ad Hoc, R3-160031, Budapest, Hungary, Jan. 20-22, 2016.
Nsn et al., "Flow Control over the X2 interface for split bearer", 3GPP TSG-RAN WG3 Meeting #83bis, R3-140614, San Jose del Cabo, Mexico, Mar. 31-Apr. 4, 2014.
International Search Report for PCT Application No. PCT/JP2018/045384, dated Feb. 26, 2019.
English translation of Written opinion for PCT Application No. PCT/JP2018/045384, dated Feb. 26, 2019.
3GPP TS 36.425 V14.0.0 (Mar. 2017), "3rd Generation Partnership Project; Technical Specification Group Radio Access Network; Evolved Universal Terrestrial Radio Access (E-UTRA); X2 interface user plane protocol (Release 14)", France.
3GPP TS 36.322 V14.0.0 (Mar. 2017), "3rd Generation Partnership Project; Technical Specification Group Radio Access Network; Evolved Universal Terrestrial Radio Access (E-UTRA); Radio Link Control (RLC) protocol specification (Release 14)", France.
3GPP TS 36.323 V14.3.0 (Jun. 2017), "3rd Generation Partnership Project; Technical Specification Group Radio Access Network; Evolved Universal Terrestrial Radio Access (E-UTRA); Packet Data Convergence Protocol (PDCP) specification (Release 14)", France.
BlackBerry UK Limited, Necessity of flow control for various U-plane alternatives [online], 3GPP TSG-RAN WG2#84 R2-134116, <URL:http://www.3gpp.org/ftp/tsg_ran/WG2_RL2/TSGR2_84/Docs/R2-134116.zip>, Nov. 15, 2013, Section2.2, USA.
Zte, Further Discussion on P-approved 36.425[online], 3GPP TSG RAN WG3 adhoc_R3_AH_NR_1706 R3-172051, Jun. 29, 2017, p. 1,pp. 8-14, China.

\* cited by examiner

Fig.5

| Bits | | | | | | | | Number of Octets |
|---|---|---|---|---|---|---|---|---|
| 7 | 6 | 5 | 4 | 3 | 2 | 1 | 0 | |
| PDU Type (=1) | | | Spare | | | Final Frame Ind. | Lost Packet Report | 1 |
| Highest successfully delivered PDCP Sequence Number | | | | | | | | 2 |
| Desired buffer size for the E-RAB | | | | | | | | 4 |
| Minimum desired buffer size for the UE | | | | | | | | 4 |
| Number of lost X2-U Sequence Number ranges reported | | | | | | | | 1 |
| Start of lost X2-U Sequence Number range | | | | | | | | 4* (Number of reported lost X2-u SN ranges) |
| End of lost X2-U Sequence Number range | | | | | | | | |
| Spare extension | | | | | | | | 0-4 |

Fig.10

| Physical Cell ID | FREE BUFFER SPACE FOR EACH CELL IN MeNB 20 | BUFFER SPACE DISTRIBUTION COEFFICIENT OF EACH DRB | FREE BUFFER SPACE OF EACH DRB |
|---|---|---|---|
| Cell#1 | 4Gbyte | UE#1, DRB#1 = 0.1 | UE#1, DRB#1 = 0.4Gbyte |
| | | UE#1, DRB#2 = 0.3 | UE#1, DRB#2 = 1.2Gbyte |
| | | ... | ... |
| | | ... | ... |
| | | UE#j, DRB#k = 0.2 | UE#j, DRB#k = 0.8Gbyte |
| ... | ... | ... | ... |

Fig.11

| | Bits | | | | | | | | Number of Octets |
|---|---|---|---|---|---|---|---|---|---|
| 7 | 6 | 5 | 4 | 3 | 2 | 1 | 0 | | |
| PDU Type (=4) | | | | Spare | | Spare | Spare | | 1 |
| Physical Cell ID | | | | | | | | | 2 |
| Desired buffer size for the Cell (1st to 4th Octet) | | | | | | | | | 4 |
| Desired buffer size for the Cell (5th to 8th Octet) | | | | | | | | | 4 |
| Spare extension | | | | | | | | | 1 |
| Spare extension | | | | | | | | | 4 |
| Spare extension | | | | | | | | | |
| Spare extension | | | | | | | | | 0-4 |

WIRELESS COMMUNICATION SYSTEM, MAIN BASE STATION, SECONDARY BASE STATION, AND WIRELESS COMMUNICATION METHOD

This application is a National Stage Entry of PCT/JP2018/045384 filed on Dec. 11, 2018, which claims priority from Japanese Patent Application 2017-238515 filed on Dec. 13, 2017, the contents of all of which are incorporated herein by reference, in their entirety.

TECHNICAL FIELD

The present invention relates to a wireless communication system, a master base station, a secondary base station, and a wireless communication method.

BACKGROUND ART

Release 12 of 3rd Generation Partnership Project (3GPP) specifies dual connectivity for transmitting and receiving packet data between one terminal and two base stations. The dual connectivity is an operation mode of a terminal that allows connection to both a master eNode B (MeNB) and a secondary eNode B (SeNB) being base stations. A cell of the MeNB is referred to as a master cell group (MCG). A cell of the SeNB is referred to as a secondary cell group (SCG). The SCG is located within a coverage area of the MCG.

In the dual connectivity, a split bearer option is defined in order to use communication bands to be operated by a plurality of wireless base stations as a single bearer. In a configuration where the split bearer option is applied to a user data communication bearer (data radio bearer: DRB), the MeNB transmits DL data received from a CN being an upper device, to a terminal via a local station and the SeNB. In this case, the MeNB performs data transfer to the SeNB after appropriately distributing the DL data volume to be delivered in each communication band under control of the local station and the SeNB. In the above, the DRB is an abbreviation for data radio bearer. The CN is an abbreviation for core network. The DL is an abbreviation for down link.

In an SCG bearer option being another bearer option for a U-Plane, data to be transmitted in the SCG do not pass through the MeNB, and thus the MeNB is not involved in transfer of U-Plane data.

On the other hand, in the split bearer option described above, DL data to be transmitted in an MCG split bearer pass through the SeNB, and thus both the MeNB and the SeNB are involved in the transfer of the U-Plane data. Therefore, flow control is required for appropriately performing data transfer from the MeNB to the SeNB.

PTL 1 describes, when the SeNB is different from a standard, a technique for including an own capacity in an SeNB add/modify command and replying to the MeNB.

PTL 2 describes a technique in which a communication terminal device selects, in an order of good line quality, the indicated number of subcarriers instructed by a base station device, based on subcarrier number information, and notifies the base station device of the selected subcarriers. Accordingly, it is considered that the base station device can allocate packet data to the subcarrier having good reception quality, and thus a user diversity effect can be acquired, throughput of the entire system can be improved, and the frequency utilization efficiency can also be improved.

CITATION LIST

Patent Literature

[PTL 1] Japanese Unexamined Patent Application Publication No. 2017-085667
[PTL 2] Japanese Unexamined Patent Application Publication No. 2010-016881

Non Patent Literature

[NPL 1] 3GPP TS 36.425 V14.0.0 (2017-03), "3rd Generation Partnership Project; Technical Specification Group Radio Access Network; Evolved Universal Terrestrial Radio Access (E-UTRA); X2 interface user plane protocol (Release 14)".
[NPL 2] 3GPP TS 36.322 V14.0.0 (2017-03), "3rd Generation Partnership Project; Technical Specification Group Radio Access Network; Evolved Universal Terrestrial Radio Access (E-UTRA); Radio Link Control (RLC) protocol specification (Release 14)".
[NPL 3] 3GPP TS 36.323 V14.3.0 (2017-06), "3rd Generation Partnership Project; Technical Specification Group Radio Access Network; Evolved Universal Terrestrial Radio Access (E-UTRA); Packet Data Convergence Protocol (PDCP) specification (Release 14)".

SUMMARY OF INVENTION

Technical Problem

According to a specification of NPL 1, the flow control is executed in units of the DRB. The number of terminals to be accommodated in the SeNB and a wireless communication environment between the SeNB and each terminal change moment by moment, and thus a volume of data that the SeNB transmits to the terminal may fluctuate. In order to appropriately perform data transfer from the MeNB to the SeNB, a flow control signal is frequently transmitted in units of the DRB.

However, in the flow control in units of the DRB, the flow control signal between the MeNB and the SeNB increases in proportion to the number of DRBs of terminals accommodated in the MeNB. Therefore, the communication band is consumed in proportion to the number of DRBs due to an increase in the flow control signal in the MeNB and the SeNB, and there is a possibility that an effect of speeding up in the dual connectivity may not be acquired. Further, for a terminal (or a cell) that remains almost unmoved or unchanged position, even when there is almost no need to frequently adjust the DL data volume to be transferred, the flow control signal in units of the DRB is frequently transmitted. As a result, throughput may decrease.

PTLs 1 and 2 do not describe any means for solving the above-described problem.

The present invention has been made in order to solve the issue described above, and an object of the present invention is to provide a wireless communication system, a master base station, a secondary base station, and a wireless communication method that enable a communication band between base stations to be efficiently used.

Solution to Problem

A wireless communication system according to the present invention includes a master base station and a secondary base station, and, when dual connectivity being an operation mode that allows connection to both the master base station and the secondary base station by a terminal is executed, the secondary base station transmits information on free buffer space of a data radio bearer group composed of a plurality of data radio bearers to the master base station in units of the data radio bearer group.

A secondary base station according to the present invention is a secondary base station communicable with a master base station and, when dual connectivity being an operation mode that allows connection to both the master base station and the secondary base station by a terminal is executed, transmits information on free buffer space of a data radio bearer group composed of a plurality of data radio bearers to the master base station in units of the data radio bearer group.

A master base station according to the present invention is a master base station communicable with a secondary base station and, when dual connectivity being an operation mode that allows connection to both the master base station and the secondary base station by a terminal is executed, receives information on free buffer space of a data radio bearer group composed of a plurality of data radio bearers from the secondary base station in units of the data radio bearer group.

A wireless communication method according to the present invention is a wireless communication method in a wireless communication system including a master base station and a secondary base station and includes, when dual connectivity being an operation mode that allows connection to both the master base station and the secondary base station by a terminal is executed, transmitting information on free buffer space of a data radio bearer group composed of a plurality of data radio bearers from the secondary base station to the master base station in units of the data radio bearer group.

Advantageous Effects of Invention

The present invention is able to use a communication band between base stations efficiently.

BRIEF DESCRIPTION OF DRAWINGS

FIG. 5 is an example of a format of a flow control signal.

FIG. 10 illustrates an example of a format of a buffer space distribution list data base (DB) to be stored in the MeNB.

FIG. 11 illustrates an example of a format of the flow control signal for each cell.

EXAMPLE EMBODIMENT

First Example Embodiment

Figure 1:
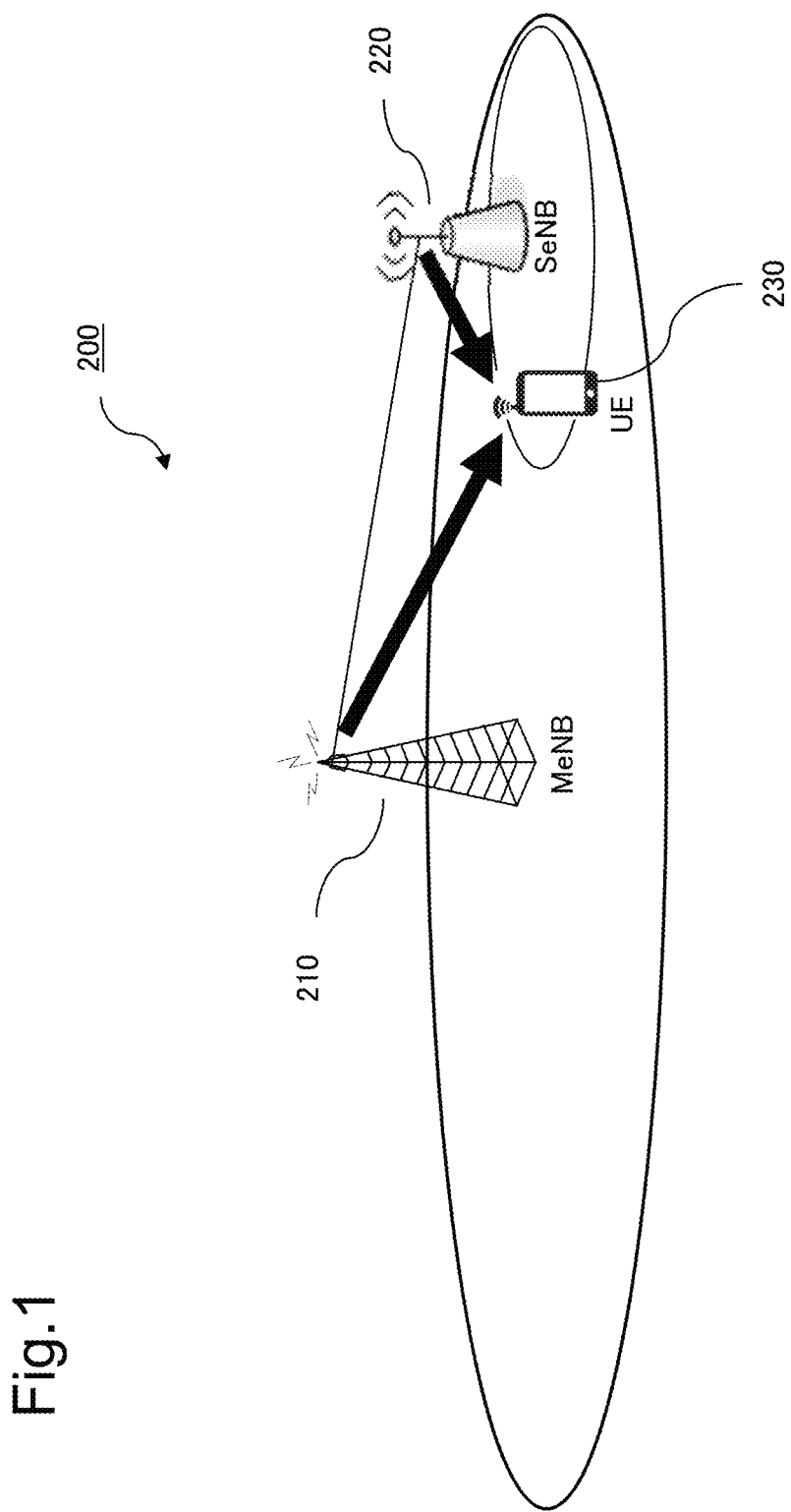
FIG. 1 is a block diagram illustrating a configuration example of a wireless communication system according to a first example embodiment of the present invention.

FIG. 1 is a block diagram illustrating a configuration example of a wireless communication system 200 according to a first example embodiment of the present invention. The wireless communication system 200 is a system conforming to Release 12 of 3GPP. The wireless communication system 200 includes a master eNode B 210 (MeNB) and a secondary eNode B (SeNB) 220 communicable with the MeNB 210. The MeNB 210 is one example of a master base station, and the SeNB 220 is one example of a secondary base station. A coverage area of the secondary base station is located within a coverage area of the master base station.

In the wireless communication system 200, the SeNB 220 transmits, when dual connectivity is executed, information on free buffer space of a DRB group composed of a plurality of data radio bearers (DRB) to the MeNB 210. In the above, the dual connectivity is an operation mode that allows connection to both the MeNB 210 and the SeNB 220 by a UE 230. The DRB is an abbreviation for a data radio bearer. The UE is an abbreviation for user equipment. The UE is one example of a terminal.

In the above, the dual connectivity is the operation mode that allows connection to both the MeNB 210 and the SeNB 220 by the UE 230.

Further, in a wireless communication method according to the first example embodiment of the present invention, when the dual connectivity is executed, the information on the free buffer space of the DRB group composed of the plurality of DRB is transmitted from the SeNB 220 to the MeNB 210 in units of the DRB group.

In FIG. 1, each of the MeNB 210, the SeNB 220, and the UE 230 is illustrated as one device, however, this is merely one example and each device may be plural.

The above DRB group may be, for example, a DRB group having, as a unit, a cell to be operated by the MeNB 210, or a DRB group having, as a unit, the UE 230 to be operated in the cell of the MeNB 210. Further, a split bearer may be an MCG split bearer or an SCG split bearer.

A transmission content, a transmission procedure, and the like of the above-described free buffer space will be described in detail in a following description according to a second example embodiment.

As described above, according to the present example embodiment, the free buffer space is transmitted from the SeNB 220 to the MeNB 210, in units (for each cell of the MeNB 210, or in units of the UE to be operated in the cell) of the above-described DRB group, but not for each DRB. Therefore, a communication between the SeNB 220 and the MeNB 210 (notification of the free buffer space: for example, the transmission of a control signal) is not increased in proportion to the number of the DRB included in the UE to be accommodated in the MeNB 210. In other words, according to the present example embodiment, the communication band between the base stations (between the SeNB 220 and the MeNB 210) can be used efficiently.

Second Example Embodiment (Description of Configuration)

Figure 2:
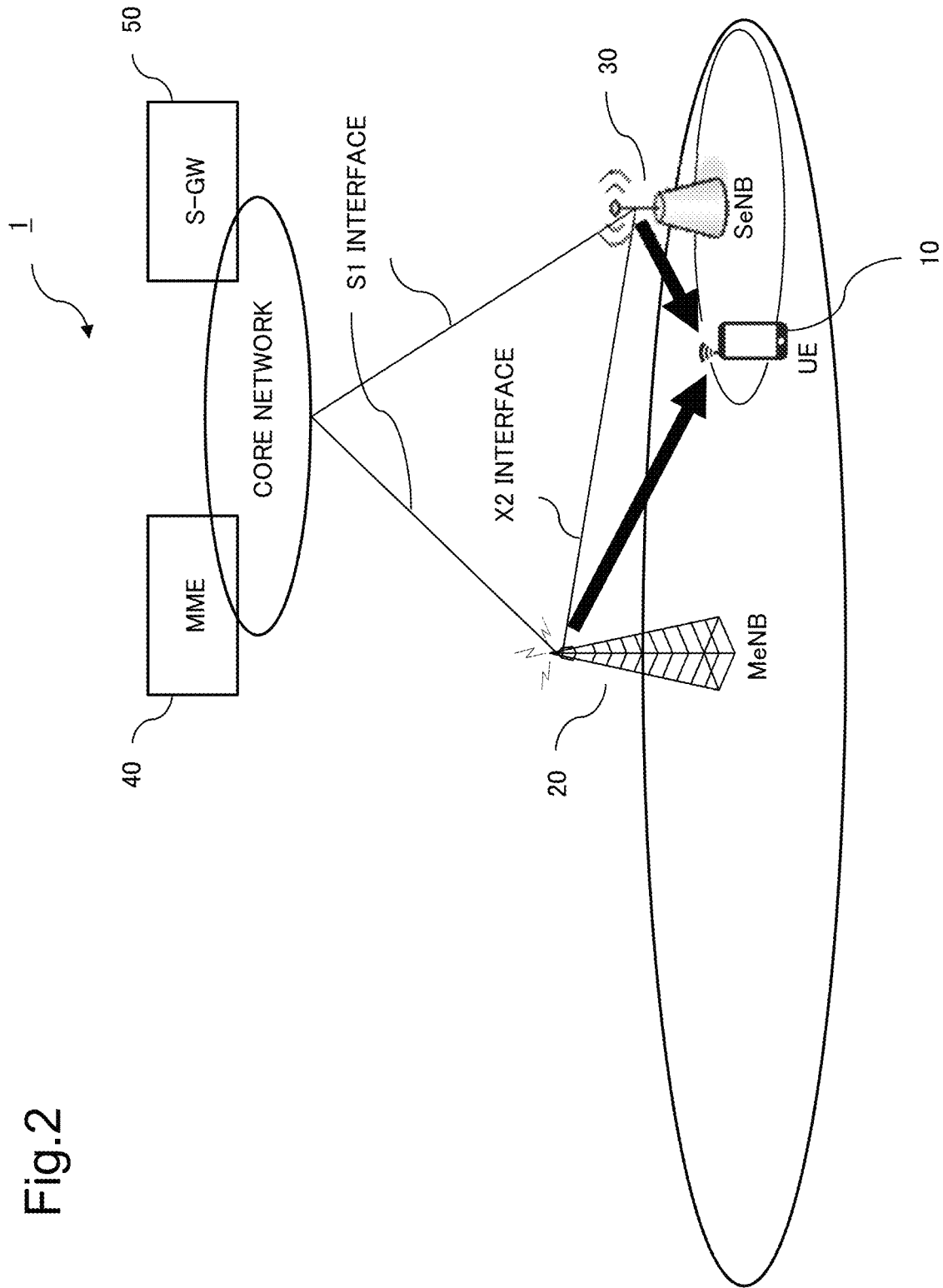
FIG. 2 is a block diagram illustrating a configuration example of a wireless communication system according to a second example embodiment of the present invention.

FIG. 2 is a block diagram illustrating a configuration example of a wireless communication system 1 according to a second example embodiment of the present invention. Dual connectivity is executed in the wireless communication system 1.

As described above, according to the present example embodiment, a DRB group is set in units of cells, and a case where a split bearer is an MCG split bearer is cited as an example. Needless to say, the DRB group is not limited to being set for each cell, but may also be set, for example, for each UE. Further, the split bearer may be the MCG split bearer or a SCG split bearer.

The wireless communication system 1 includes a UE 10 (user equipment) being a terminal, an MeNB 20, an SeNB 30, a mobility management entity (MME) 40, and a serving gateway (S-GW) 50.

The UE 10 receives DL data from the two base stations (the MeNB 20 and the SeNB 30). With respect to up link (UL) data, the UE 10 transmits the UL data only to the MeNB 20 or to the two base stations (the MeNB 20 and the SeNB 30).

The MME 40 is a network device constituting a core network (CN), and performs transmission of a Control (C)-Plane and mobility management of the UE 10.

The S-GW 50 is a network device constituting the CN, and performs transmission of the DL data of a User (U)-Plane.

The MeNB 20 and the SeNB 30 are connected via an X2 interface. The MME 40 and the S-GW 50 are connected to the MeNB 20 and the SeNB 30 via an S1 interface.

The SeNB 30 transmits, by a connection to the MeNB 20 and a wireless connection to the UE 10, the DL data received from the network devices (the MME 40 and the S-GW 50) in the CN and a network device such as a server to be connected to the CN, to the UE 10. The SeNB 30 transmits the UL data received from the UE 10 to the above-described various network devices.

The MeNB 20 transmits, by a wireless connection to the UE 10, the DL data received from the above-described various network devices to the UE 10. The MeNB 20 transmits the UL data received from the UE 10 to the above-described various network devices. Further, by setting the dual connectivity, the MeNB 20 can directly transmit the DL data received from the CN to the UE 10, and can transmit the DL data to the UE 10 via the SeNB 30.

In FIG. 2, two base stations and one terminal are illustrated. However, this is merely one example and, in practice, a plurality of base stations are arranged in such a way as to cover a service area of the wireless communication system 1, and each base station accommodates a plurality of terminals.

In the dual connectivity, a split bearer option is defined in order to use communication bands to be operated by a plurality of wireless base stations as a single bearer.

Figure 3:
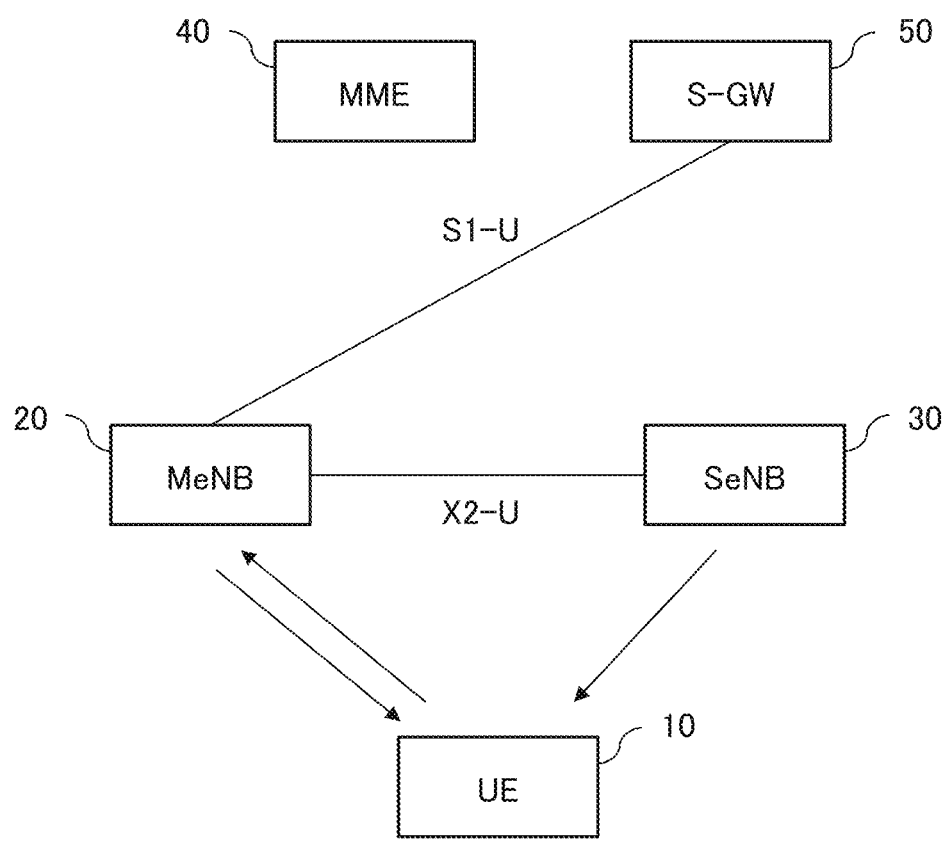
FIG. 3 illustrates an example of a connection configuration of a U-Plane in a split bearer option.
Figure 4:
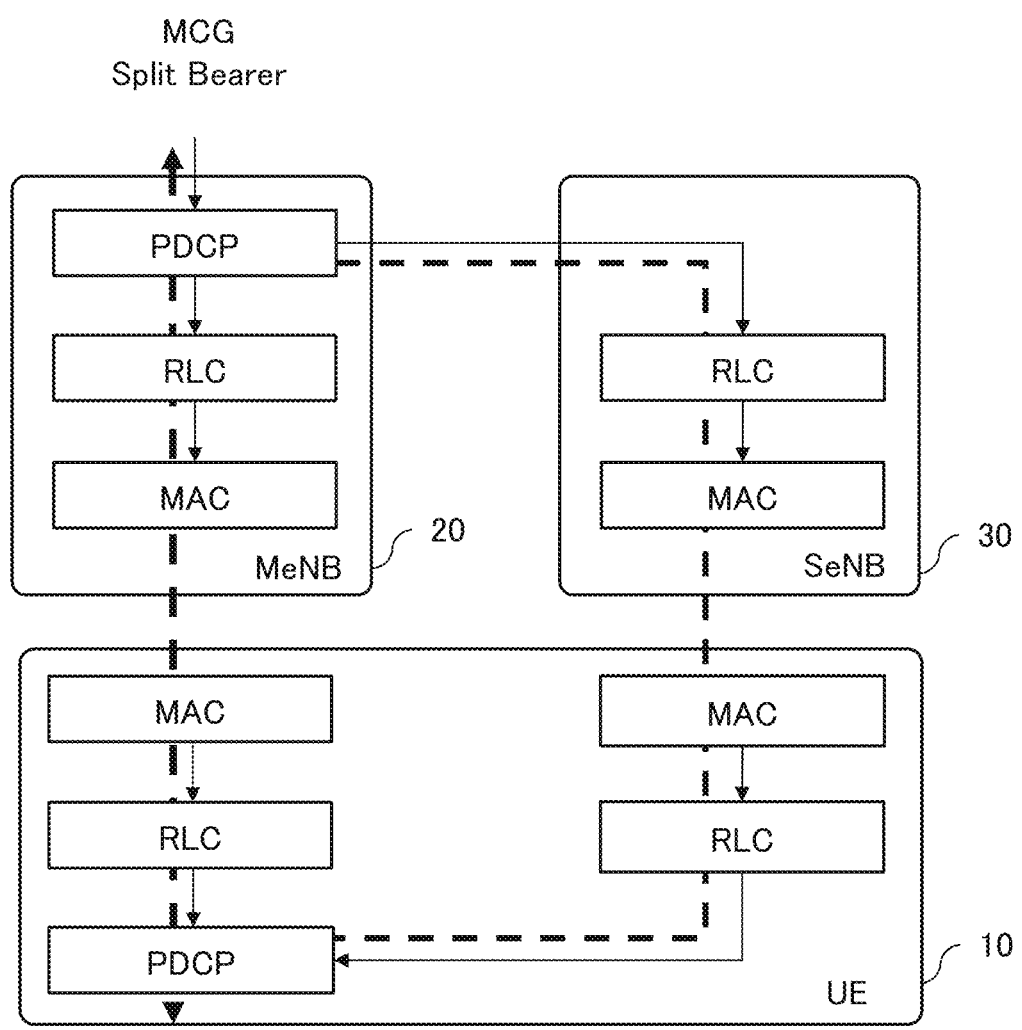
FIG. 4 illustrates an example of a connection configuration of a wireless protocol in the split bearer option.

FIG. 3 illustrates an example of a connection configuration of the U-Plane in the split bearer option. FIG. 4 illustrates an example of a connection configuration of a wireless protocol in the split bearer option.

As illustrated in FIGS. 3 and 4, in the case of the split bearer option, the DL data of the U-Plane are transmitted from the S-GW 50 to the MeNB 20 only, and is not transmitted from the S-GW 50 to the SeNB 30. The DL data are transmitted from the MeNB 20 to the UE 10 directly. Further, the DL data are transmitted from the MeNB 20 to the UE 10 via the SeNB 30.

As illustrated in FIG. 4, each of the UE 10, the MeNB 20, and the SeNB 30 is constituted of a packet data convergence protocol (PDCP) layer, a radio link control (RLC) layer, and a medium access control (MAC) layer. The PDCP is an abbreviation for packet data convergence protocol. The RLC is an abbreviation for radio link control. The MAC is an abbreviation for medium access control.

In the case of the split bearer option, the DL data of the U-Plane received from the S-GW 50 are accepted by the PDCP layer in the MeNB 20. Herein, the PDCP layer in the MeNB 20 transmits a part of the DL data (PDCP PDU) to the UE 10 via a cell under control of a local station, and transmits another one part of the DL data (PDCP PDU) to the UE 10 via the SeNB 30. In other words, in the case of the split bearer option, the DL data of the U-Plane are separated in the PDCP layer of the MeNB 20. The PDU is an abbreviation for a protocol data unit.

In the split bearer option, the SeNB 30 provides feedback on a flow control signal (control signal) for the MeNB 20 in order to fully use a communication band of the SeNB 30 without pressing the communication band of the SeNB 30. Then, the MeNB 20 adjusts a data volume (i.e., amount of PDCP PDU) of the DL data to be transmitted to the SeNB 30 with reference to the flow control signal.

FIG. 5 is an example of a format of the flow control signal. The flow control signal is a signal for notifying the MeNB 20 of a state of the SeNB 30 side and appropriately performing data transfer from the MeNB 20 to the SeNB 30, in order for the MeNB 20 to control a transmission path of the DL data. As described in NPL 1, information on the flow control signal is included in a RAN container added to an extension of a GTP header, similarly to the DL data (PDU type=1). In the above, the GTP is an abbreviation for GPRS tunneling protocol. The GPRS is an abbreviation for a general packet radio service. The RAN is an abbreviation for a radio access network.

The flow control signal includes "Highest successfully delivered PDCP Sequence Number", "Desired buffer size for the E-RAB", and "Minimum desired buffer size for the UE".

"Highest successfully delivered PDCP sequence number" indicates a transmission confirmation from the UE 10 with respect to the DL data transmitted to the UE10 by the SeNB 30, or the last PDCP SN when an RLC ACK message is received. "Desired buffer size for the E-RAB" and "Minimum desired buffer size for the UE" indicate buffer space required for transmitting the DL data by the SeNB 30.

In addition, the flow control signal includes, as an optional function, X2-U SN ("Number of lost X2-U Sequence Number ranges reported", "Start of lost X2-U Sequence Number range", "End of lost X2-U Sequence Number range") of data that detects DL data loss in the SeNB 30.

Further, the flow control signal includes information (Final Frame Ind.) indicating the last control data, and the like.

In the above, the reception of the RLC ACK message from the UE is equivalent to the reception of a Status PDU (or Status Report) in NPL 2 (3GPP TS 36.322 V14.0.0). Further, the MeNB 20 refers to the notified PDCP SN, and deletes, from a PDCP buffer, a PDCP service data unit (SDU) that the UE has already received.

The RLC ACK message does not always pass through the SeNB 30 and the MeNB 20 can also receive the RLC ACK message directly from the UE 10. In this case, the flow control signal does not need to include "Highest successfully delivered PDCP Sequence Number" based on the RLC ACK message.

Figure 6:
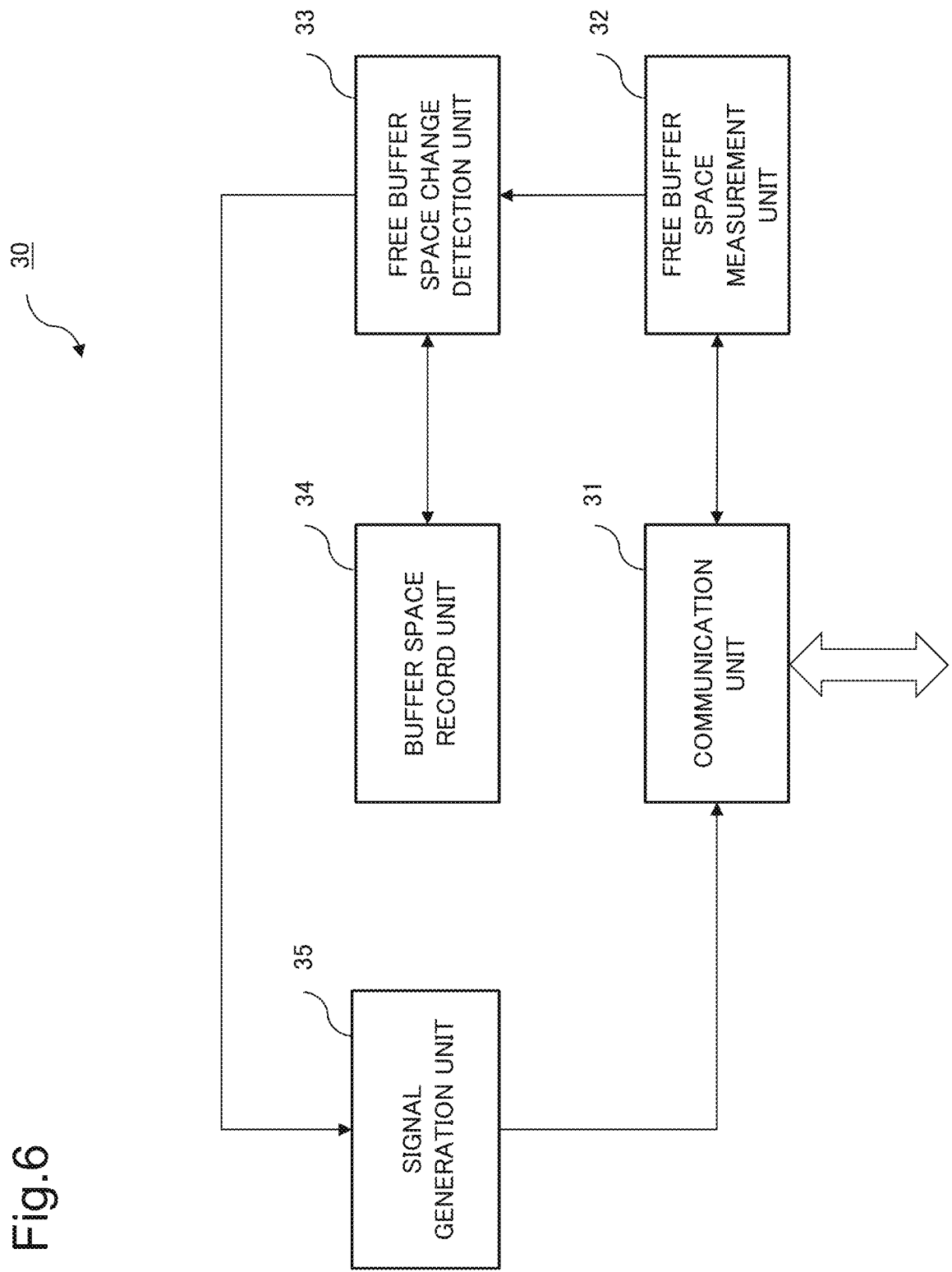
FIG. 6 is a block diagram illustrating a configuration example of an SeNB illustrated in FIG. 2.

FIG. 6 is a block diagram illustrating a configuration example of the SeNB 30 illustrated in FIG. 2. The SeNB 30 includes a communication unit 31, a free buffer space measurement unit 32, a free buffer space change detection unit 33, a buffer space record unit 34, and a signal generation unit 35.

The communication unit 31 performs communication with the S-GW 50, the MeNB 20, and the UE 10.

The free buffer space measurement unit 32 regularly refers to a buffer of each DRB in the communication unit 31, measures free buffer space of each DRB, calculates free buffer space for each cell to be operated by the MeNB 20, and notifies the free buffer space change detection unit 33 of the calculated free buffer space for each cell to be operated by the MeNB 20.

The free buffer space change detection unit 33 compares the notified free buffer space for each cell to be operated by the MeNB 20 with a threshold value set from the previous free buffer space for each cell to be operated by the MeNB 20 stored in the buffer space record unit 34. The free buffer space change detection unit 33 detects a change in the free buffer space for each cell to be operated by the MeNB 20 at the time of the measurement from the previous operation. When detecting the change in the free buffer space for each cell to be operated by the MeNB 20, the free buffer space change detection unit 33 determines that a congestion degree of the cell has changed and instructs the signal generation unit 35 to generate a control signal (flow control signal). On the other hand, when the change in the free buffer space for each cell to be operated by the MeNB 20 is not detected, the free buffer space change detection unit 33 determines that the congestion degree of the cell has not changed and does not instruct the signal generation unit 35 to generate the signal.

The buffer space record unit 34 updates and stores information on the free buffer space for each cell to be operated by the MeNB 20. For example, each time the flow control signal is transmitted, the buffer space record unit 34 updates and stores the information on the free buffer space for each cell to be operated by the MeNB 20.

The signal generation unit 35 is notified of the generation of the signal from the free buffer space change detection unit 33, generates the flow control signal, and transmits the generated signal from the communication unit 31 to the MeNB 20. The pieces of information included in the flow control signal are a physical cell identification (hereinafter, indicated as a physical cell ID) of a cell included in a measurement report of the UE 10 at a time of setting of the dual connectivity managed by the SeNB 30, and the information ("Desired buffer size for the cell") on the free buffer space for each cell to be operated by the MeNB 20 notified from the free buffer space change detection unit 33.

Herein, the format of the flow control signal newly defined for each cell will be described with reference to FIG. 11. It is assumed that the PDU type of the flow control signal is "4". In the flow control signal, the physical cell ID is prepared in 2 Octets. Further, in the flow control signal, the information on the free buffer space for each cell to be operated by the MeNB 20 is prepared in 8 Octets as "Desired buffer size for the cell". Other information may be unnecessary. The signal to be generated herein may add information (physical cell ID and the free buffer space for each cell to be operated by the MeNB 20) required for the flow control signal (PDU type=1) defined for the dual connectivity, or may define a new X2 message.

The function of each configuration illustrated in FIG. 6 may be achieved by an electronic circuit such as an integrated circuit (IC) and a field programmable gate array (FPGA). Alternatively, the function of each configuration may be achieved by a computer (for example, central processing unit (CPU)) executing a program stored in a memory. The function of each configuration may also be achieved by a combination of the electronic circuit and the computer.

Figure 7:
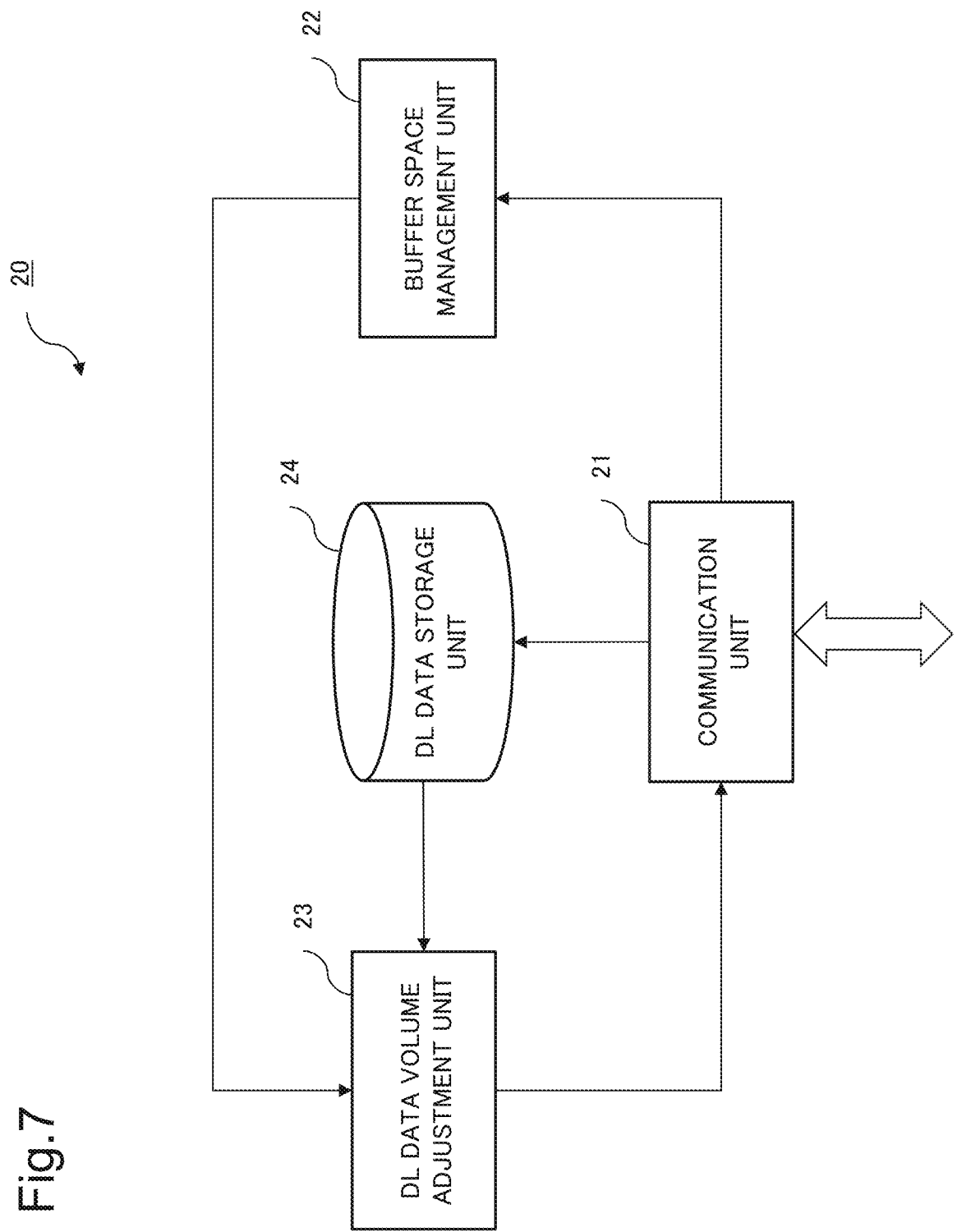
FIG. 7 is a block diagram illustrating a configuration example of an MeNB illustrated in FIG. 2.

FIG. 7 is a block diagram illustrating a configuration example of the MeNB 20 illustrated in FIG. 2.

The MeNB 20 includes a communication unit 21, a buffer space management unit 22, a DL data volume adjustment unit 23, and a DL data storage unit 24.

The communication unit 21 can communicate with the S-GW 50, the SeNB 30, the UE 10, and the like. The communication unit 21 receives the flow control signal from the SeNB 30.

The buffer space management unit 22 stores a buffer space distribution list DB as illustrated in FIG. 10. The buffer space distribution list DB includes the information on the free buffer space for each cell to be operated by the MeNB 20, information on a buffer space distribution coefficient of each DRB, and information on a transmission buffer size of each DRB.

The buffer space management unit 22 identifies the information on PDU type(=4) included in the flow control signal received from the SeNB 30 with respect to the free buffer space for each cell to be operated by the MeNB 20. The buffer space management unit 22 updates the buffer space distribution list DB by extracting, from the identified information, the information on the free buffer space for each cell to be operated by the MeNB 20 and reflecting the extracted free buffer information.

The buffer space distribution coefficient of each DRB may be calculated, for example, by a proportion of a transmission rate of the DL data transmitted from the MeNB 20 to the UE 10 by each DRB and a transmission rate of the whole DRB for a certain period of time.

A transmission buffer size of each DRB is calculated, for example, by multiplying the free buffer space for each cell to be operated by the MeNB 20 by the buffer space distribution coefficient of each DRB. The buffer space management unit 22 updates the buffer space distribution list DB by reflecting the calculated transmission buffer size of each DRB. The buffer space management unit 22 notifies the DL data volume adjustment unit 23 of the updated buffer space distribution list DB.

The DL data volume adjustment unit 23 extracts DL data from the DL data storage unit 24 and converts the extracted DL data into data for each DRB. Further, the DL data volume adjustment unit 23 refers to the buffer space distribution list DB notified by the buffer space management unit 22, and adjusts the DL data volume transmitted from the MeNB 20 to the SeNB 30. The communication unit 21 transmits the DL data from the DL data volume adjustment unit 23 to the SeNB 30.

The DL data storage unit 24 stores the received DL data from the S-GW 50 via the communication unit 21.

When the flow control signal is transmitted for each cell, the information on the PDCP SN of which reception is confirmed by the UE 10 is not included in the flow control signal from the SeNB 30 to the MeNB 20. Accordingly, in order to delete, from the PDCP buffer, the PDCP SDU already received by the UE 10, the MeNB 20 regularly transmits the PDCP status report signal from the UE 10 directly to the MeNB 20 (NPL 3: 3GPP TS 36.323 V14.3.0), and the UE 10 deletes the received PDCP SDU from the PDCP buffer.

The function of each configuration illustrated in FIG. 7 may be achieved by an electronic circuit such as an IC and a FPGA. Alternatively, the function of each configuration may be achieved by a computer (for example, CPU) executing a program stored in a memory. The function of each configuration may also be achieved by a combination of the electronic circuit and the computer.
(Description of Operation)

Figure 8:
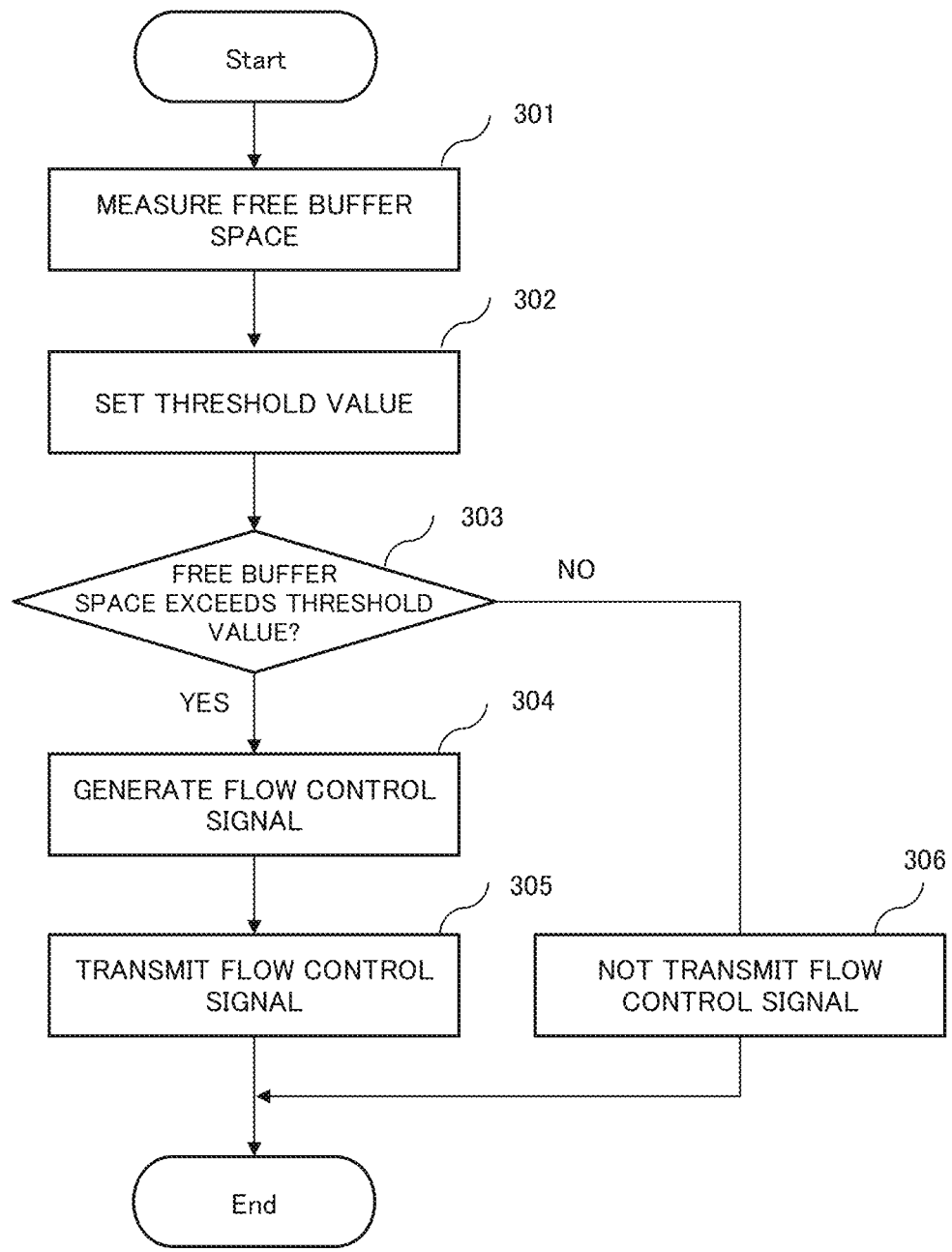
FIG. 8 is a flowchart illustrating an operation example of the SeNB illustrated in FIG. 6.

FIG. 8 is a flowchart illustrating an operation example of the SeNB 30 illustrated in FIG. 6.

The SeNB 30 measures the free buffer space of each DRB (step S301). Specifically, the free buffer space of each DRB is equivalent to information ("Desired buffer size for the E-RAB") of the buffer space included in the flow control signal (PDU type=1). In NPL1 (3GPP TS 36.425 V14.0.0), "Desired buffer size for the E-RAB" is not clearly defined. Therefore, according to the present example embodiment, "Desired buffer size for the E-RAB" is defined as free buffer space after subtracting non-received buffer space of the PDCP PDU with the RLC ACK from total buffer space per E-RAB. The free buffer space measurement unit 32 in the SeNB 30 regularly refers to the buffer of each DRB in the communication unit 31, measures the free buffer space of each DRB, and calculates as free buffer space of each UE from a sum of the free buffer space of each DRB. The free buffer space measurement unit 32 calculates as free buffer space for each cell to be operated by the MeNB 20 from a sum of the free buffer space for each UE unit to be operated by the MeNB 20. Herein, the free buffer space for each cell to be operated by the MeNB 20 is defined as Nt1.

Next, the SeNB 30 sets a threshold value (step S302). Schematically, the threshold value is a threshold value for determining a predetermined range centered on the free buffer space at a time of transmitting the flow control signal to the MeNB 20 last time. Specifically, the buffer space record unit 34 in the SeNB 30 stores information on the free buffer space for each cell to be operated by the MeNB 20 at the time of transmitting the flow control signal last time. For example, the time when the flow control signal is transmitted last time is defined as t0, and free buffer space for each cell to be operated by the MeNB 20 at the time t0 (time: e.g., at 10 o'clock in the morning) is defined as Nt0 (byte: e.g., 100 Mbytes). The free buffer space change detection unit 33 acquires Nt0 from the buffer space record unit 34, and sets a threshold value (e.g., low threshold value and high threshold value) by using a predetermined range of Nt0. For example, the above-described predetermined range is set to a coefficient M (any real number: e.g., 10) %, and a coefficient in a range that is not affected by the congestion degree of the cell can be used according to an actual operation environment. Herein, the low threshold value is defined by Nt0×(1−M %), and the high threshold value is defined by Nt0×(1+M %). Note that a range less than M % of Nt0 is defined as within the threshold range, and a range other than M % of Nt0 is defined as outside the threshold range.

The SeNB 30 determines whether the free buffer space exceeds the threshold value. (step S303). Specifically, the free buffer space change detection unit 33 determines, at a measurement time t1(>t0), the transmission of the flow control signal, based on a magnitude relationship between the free buffer space for each cell to be operated by the MeNB 20 and the threshold value.

A relational inequality regarding a comparison between the free buffer space for each cell to be operated by the MeNB 20 and the threshold value (low threshold value and high threshold value) at the measurement time t1 is as follows.

$$Nt1 \geq Nt0 \times (1+M\%) \quad (1)$$

$$Nt1 \leq Nt0 \times (1-M\%) \quad (2)$$

$$Nt0 \times (1-M\%) < Nt1 < Nt0 \times (1+M\%) \quad (3)$$

A situation in which the inequality (1) is satisfied is a situation in which the free buffer space for each cell to be operated by the MeNB 20 exceeds the high threshold value at the measurement time t1. In this situation, the number of terminals decreases sharply and the congestion degree of the cell eases rapidly. In this case, a wireless communication speed per terminal increases rapidly. At this time, the free buffer space change detection unit 33 determines that the transmission of the flow control signal is necessary, and instructs the signal generation unit 35 to generate the signal.

A situation in which the inequality (2) is satisfied is a situation in which the free buffer space for each cell to be operated by the MeNB 20 falls below the low threshold value at the measurement time t1. In this situation, the number of terminals increases sharply and the congestion degree of the cell increases rapidly. In this case, the wireless communication speed per terminal decreases rapidly. At this time, the free buffer space change detection unit 33 determines that the transmission of the flow control signal is necessary, and instructs the signal generation unit 35 to generate the signal.

A situation in which the inequality (3) is satisfied is a situation in which the free buffer space for each cell to be operated by the MeNB 20 is within the threshold range at the measurement time t1. In this situation, the number of terminals does not particularly increase nor decrease rapidly, and the congestion degree of the cell to be operated by the MeNB 20 is almost unchanged. In this case, the wireless communication speed per terminal is stable. At this time, the free buffer space change detection unit 33 determines that the transmission of the flow control signal is not necessary, and does not instruct the signal generation unit 35 to generate the signal.

As described above, when performing communication control in consideration of the congestion degree of the wireless communication, the SeNB 30 (the free buffer space change detection unit 33) controls in such a way as to transmit the flow control signal for each cell only when the congestion degree of the cell changes due to a rapid increase or a rapid decrease in the number of terminals during connection.

The SeNB 30 generates the flow control signal (step S304). Specifically, the signal generation unit 35 generates the flow control signal, based on a determination result in the free buffer space change detection unit 33 that the free buffer space has exceeded the threshold value (outside the threshold range). In this case, the buffer space record unit 34 overwrites and saves the free buffer space for each cell to be operated by the MeNB 20 in the buffer space record unit 34. The overwritten free buffer space is used for the next generation of a threshold value. The buffer space record unit 34 provides the signal generation unit 35 with the information on the free buffer space for each cell to be operated by the MeNB 20. As the generation of the flow control signal, the PDU type is set to 4, and information on the physical cell ID and the free buffer space for each cell to be operated by the MeNB 20 "Desired buffer size for the Cell" is stored, based on the information on the free buffer space for each cell to be operated by the MeNB 20 from the buffer space record unit 34. Herein, in order to generate the flow control signal for each cell, it is assumed that a tunnel endpoint ID (TEID) included in the GTP header is a TEID related to any one of the DRB connected to the MeNB 20. For example, a TEID related to UE ID=1, DRB=1 may be used. Note that each DRB being a target in step S301 generates the flow control signal for each cell, and thus the flow control signal in units of the DRB is unnecessary.

The SeNB 30 transmits the flow control signal (step S305). Specifically, the communication unit 31 in the SeNB 30 transmits the flow control signal received from the signal generation unit 35 to the MeNB20.

On the other hand, when the free buffer space is determined as within the threshold range in the free buffer space change detection unit 33, the flow control signal is not transmitted from the communication unit 31 (step S306), and processing of the flowchart ends.

As described above, the free buffer space for each cell does not exceed the threshold range in the situation where the congestion degree of the cell is almost unchanged. Thus, when the feedback on the free buffer space for each cell to be operated by the MeNB 20 is provided for the MeNB 20 in a first place (i.e., at startup and at a time of a change in the free buffer space), it is not necessary to update until there is a change in the congestion degree of the cell. Therefore, the number of transmissions of the flow control signal can be significantly reduced.

When the function of each configuration illustrated in FIG. 6 is achieved by a computer, processing illustrated in FIG. 8 is stored as a computer program in a computer readable memory (recording medium).

Figure 9:
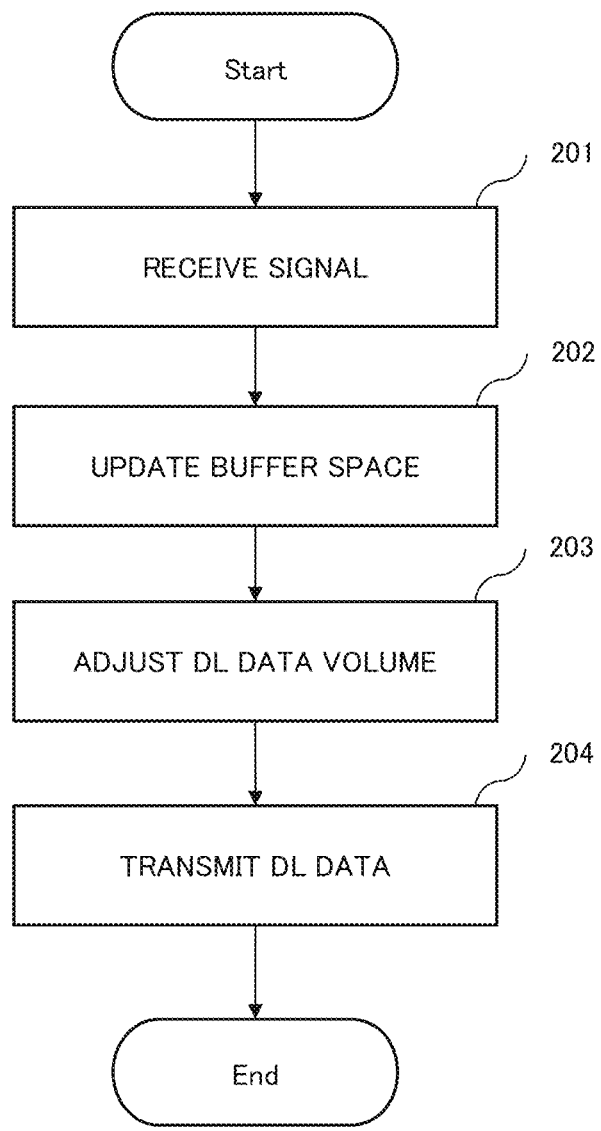
FIG. 9 is a flowchart illustrating an operation example of the MeNB illustrated in FIG. 7.

FIG. 9 is a flowchart illustrating an operation example of the MeNB 20 illustrated in FIG. 7.

The communication unit 21 in the MeNB 20 receives the flow control signal from the SeNB 30 (step S201).

The buffer space management unit 22 in the MeNB 20 updates a parameter (see FIG. 10) of the stored buffer space distribution list DB (step S202). With respect to the free buffer space for each cell to be operated by the MeNB 20, the buffer space management unit 22 identifies information for each cell from the information on the PDU type(=4) included in the flow control signal received from the SeNB 30. The buffer space management unit 22 updates the buffer space distribution list DB by extracting, from the identified information, the information (information on the physical cell ID and the information on the free buffer space for each cell to be operated by the MeNB 20 ("Desired buffer size for the Cell")) for each cell, and reflecting the extracted information for each cell.

The buffer space distribution coefficient of each DRB is calculated, for example, by using information on the PDCP status report signal to be regularly transmitted from the UE 10 directly to the MeNB 20. A transmission rate of each DRB is calculated by the DL data volume to be transmitted by each DRB and the DL data volume actually transmitted from the information on the PDCP status report signal for a certain period of time (e.g., from the reception of the PDCP status report signal to the reception of the next PDCP status report signal). Herein, the transmission rate of each DRB is defined as a rate of the DL data volume that can be transmitted from the MeNB 20 to the UE 10 and can also be received by the UE 10 correctly for the period of time from the reception of the PDCP status report signal to the reception of the next PDCP status report signal. The buffer space distribution coefficient of each DRB is calculated by contrasting the transmission rate of each DRB with the transmission rate (the transmission rate for each cell to be operated by the MeNB 20) of the whole DRB. The buffer space distribution list DB is updated by the calculated buffer space distribution coefficient of each DRB.

The free buffer space of each DRB to be stored in the buffer space distribution list DB is calculated by multiplying the free buffer space for each cell to be operated by the MeNB 20 by the buffer space distribution coefficient of each DRB. Thus, an update timing of the free buffer space of each DRB is set to a timing when the flow control signal for each cell is received or when the buffer space distribution coefficient of each DRB is updated. The free buffer space of each DRB is determined according to the buffer space distribution list DB illustrated in FIG. 10.

Further, the DRB that does not exist in the buffer space distribution list DB illustrated in FIG. 10 is regarded as out of the target for each cell, and the flow control signal (PDU type(=1)) in units of the DRB may be transmitted from the SeNB 30 to the MeNB 20. The out of the target for each cell is, for example, a DRB to be newly connected to the SeNB 30 after a regular measurement in each DRB in the above-described "Measure free buffer space (FIG. 8: step S301)".

Therefore, the information on the DRB to be newly connected to the SeNB 30 is set to the buffer space distribution list DB. For example, "Desired buffer size for the E-RAB" included in the flow control signal (PDU type (=1)) may be set for the free buffer space of the DRB, and 0 may be set for the buffer space distribution coefficient of the DRB.

The DL data volume adjustment unit 23 in the MeNB 20 extracts the DL data from the DL data storage unit 24 and converts the extracted DL data into data. Further, the DL data volume adjustment unit 23 refers to the buffer space distribution list DB notified from the buffer space management unit 22, and adjusts the DL data volume from the MeNB 20 to the SeNB 30 (step S203).

The communication unit 21 transmits the DL data received from the DL data volume adjustment unit 23 to the SeNB 30 (step S204).

When the function of each configuration illustrated in FIG. 7 is achieved by a computer, processing illustrated in FIG. 9 is stored as a computer program in a computer readable memory (recording medium).

Description of Advantageous Effects

According to the second example embodiment described above, the flow control signal (control signal) is transmitted for each cell in the split bearer option. A proper transmission of the flow control signal depending on the congestion degree of the cell enables reducing a needless transmission of the flow control signal between the SeNB 30 and the MeNB 20 significantly. As a result, consumption of the communication band by the flow control signal is suppressed, and the communication band can be used efficiently between the SeNB and the MeNB.

Modification Example

The flow control signal (equivalent to "the free buffer space in units of the DRB group" according to the first example embodiment) is not limited to the message of the PDU type 1 specified in 3GPP TS 36.425, and a message of the PDU type 4 as a new message. The flow control signal may be a message of another PDU type (e.g., type 0, type 2 and type 3), or may be a message that is not specified in 3GPP TS 36.425.

Further, the unit for transmitting the free buffer space (in other words, the flow control signal) need not always be the unit of the DRB group (for each cell or in units of the UE). For example, the unit for transmitting the free buffer space may be switched between the unit of the DRB group and the unit of the DRB according to a predetermined condition. The predetermined condition is, for example, a degree of urgency or quality of service (QoS). Further, any switching cycle is applicable.

While the invention has been particularly shown and described with reference to example embodiments thereof, the invention is not limited to these embodiments. It is obvious to those of ordinary skill in the art that various changes in form or details are added may be made therein. Therefore there needs no explanation to that the technical scope of the present invention includes forms to which such changes in form or details are added. Further, the numerical value, the name or the like of each constitution is only an example and can be appropriately changed. As such, various forms without departing from the technical scope of the present invention understood by those of ordinary skill in the art can be applied with the present invention.

This application is based upon and claims the benefit of priority from Japanese patent application No. 2017-238515, filed on Dec. 13, 2017, the disclosure of which is incorporated herein in its entirety by reference.

REFERENCE SIGNS LIST

1 Wireless communication system
10 UE
20 MeNB
21 Communication unit
22 Buffer space management unit
23 DL data volume adjustment unit
24 DL data storage unit
30 SeNB
31 Communication unit
32 Free buffer space measurement unit
33 Free buffer space change detection unit
34 Buffer space record unit
35 Signal generation unit
40 MME
50 S-GW
200 Wireless communication system
210 MeNB
220 SeNB

What is claimed is:

1. A wireless communication system comprising:
a master base station configured to operate a master cell group having a first coverage area, and
a secondary base station configured to operate a secondary cell group having a second coverage area that is different from the first coverage area and that is located in the first coverage area, wherein
the secondary base station transmits, when executing dual connectivity that is an operation mode permitting connection to both the master base station and the secondary base station by a terminal, information on free buffer space of a data radio bearer group of a plurality of data radio bearers to the master base station in units of the data radio bearer group, the units of the data radio bearer group being units of a given cell of a plurality of cells included in the master cell group,
wherein the information on the free buffer space is transmitted via a control signal that is switched between a first control signal of the data radio bearer group in the units of the given cell and a second control signal of an individual data radio bearer within the data radio bearer group in the units of the given cell included in the master cell group according to a degree of urgency,
wherein the secondary base station:
detects, for each of the plurality of cells included in the master cell group, a change in the free buffer space as compared to a previous measurement of the free buffer space measured at a last time of transmitting the control signal to the master base station,
determines whether a congestion degree increases or decreases at a rate greater than a threshold, based on the change in the free buffer space, and
generates the control signal in both a case in which the congestion degree increases at the rate greater than the threshold and a case in which the congestion degree decreases at the rate greater than the threshold,
and wherein the secondary base station determines whether the congestion degree increases or decreases based on a predetermined range centered on the free buffer space at the last time of transmitting the control signal to the master base station.

2. The wireless communication system according to claim 1, wherein
the data radio bearer group is of the master base station or of the terminal, and
the units of the data radio bearer group are first units of the given cell included in the master cell group in a case in which the data radio bearer group is of the master base station, and the units of the data radio bearer group are second units of the terminal to be operated in the given cell included in the master cell group in a case in which the data radio bearer group is of the terminal.

3. The wireless communication system according to claim 1, wherein
the control signal is included in at least any one of each of a plurality of messages of PDU type 0 to 3 specified by 3rd Generation Partnership Project (3GPP) TS 36.425, and a message of PDU type 4 as a new message.

4. The wireless communication system according to claim 1, wherein
when the free buffer space at a present time is outside the predetermined range, the secondary base station determines that the congestion degree increases or decreases, and generates the control signal.

5. The wireless communication system according to claim 1, wherein
the first control signal includes the information on the free buffer space in the units of the given cell included in the master cell group, and information on identification of a cell included in a measurement report of the terminal at setting of dual connectivity.

* * * * *